United States Patent
Wang et al.

(10) Patent No.: US 10,509,237 B2
(45) Date of Patent: Dec. 17, 2019

(54) METHOD AND APPARATUS FOR MEASURING ADD POWER OF A CONTACT LENS

(71) Applicant: CooperVision International Holding Company, LP, St. Michael (BB)

(72) Inventors: Daozhi Wang, Dublin, CA (US); Laura Horan, Constance (DE)

(73) Assignee: CooperVision International Holding Company, LP, St. Michael (BB)

( * ) Notice: Subject to any disclaimer, the term of this patent is extended or adjusted under 35 U.S.C. 154(b) by 95 days.

(21) Appl. No.: 15/957,947

(22) Filed: Apr. 20, 2018

(65) Prior Publication Data
US 2018/0313717 A1    Nov. 1, 2018

(30) Foreign Application Priority Data

Apr. 28, 2019 (GB) .................................. 1706846.1

(51) Int. Cl.
G02C 7/04 (2006.01)
G01M 11/02 (2006.01)

(52) U.S. Cl.
CPC ......... *G02C 7/044* (2013.01); *G01M 11/0235* (2013.01); *G02C 7/04* (2013.01); *G02C 7/041* (2013.01); *G02C 2202/22* (2013.01)

(58) Field of Classification Search
None
See application file for complete search history.

(56) References Cited

U.S. PATENT DOCUMENTS

2006/0244916 A1  11/2006 Guillon
2014/0176904 A1   6/2014 Lai
2016/0310001 A1  10/2016 Lai

FOREIGN PATENT DOCUMENTS

WO    2013114206 A1    8/2013

OTHER PUBLICATIONS

International Search Report and Written Opinion issued in corresponding International Patent Application No. PCT/GB2018/051141 dated Aug. 1, 2018 (17 pages).
Baumer, "Optocraft—Unleased Wavefront Technology," 2011, XP055492411, URL: http://www.optophase.com/Brochure/OPTOCRAFT/OPTOCRAFT_brochure.pdf, pp. 1-20.
Jeong et al., "Measurement of wave-front aberration in soft contact lenses by use of a Shack-Hartmann wave-front sensor," Applied Optics, 2005, vol. 44, No. 21, pp. 4523-4527.
Kim et al., "Reliability of power profiles measured on NIMO TR1504 (Lambda-X) and effects of lens decentration for single vision, bifocal and multifocal contact lenses," Journal of Optometry, 2016, vol. 9, pp. 126-136.
Plainis et al., "Power Profiles of Multifocal Contact Lenses and Their Interpretation," Optometry and Vision Science, 2013, vol. 90, No. 10., pp. 1066-1077.
Search and Examination Report issued in United Kingdom Patent Application No. GB1706846.1 dated Oct. 26, 2017 (9 pages).
Written Opinion of the International Preliminary Examining Authority issued in corresponding International Patent No. PCT/GB2018/051141 dated Apr. 1, 2019 (8 pages).
International Preliminary Report on Patentability issued in corresponding International Patent Application No. PCT/GB2018/051141 dated Jun. 18, 2019 (12 pages).

*Primary Examiner* — Darryl J Collins
*Assistant Examiner* — Journey F Sumlar
(74) *Attorney, Agent, or Firm* — Kilyk & Bowersox, P.L.L.C.

(57) ABSTRACT

A contact lens has a central region and an annular region surrounding the central region, the central region having a first optical power and the annular region having a second optical power. In a method of measuring the add power, the wavefront aberration of the contact lens is measured; a polynomial is fitted to the measured wavefront aberration. Terms of the polynomial correspond to types of aberration comprising defocus and astigmatism and residual aberrations. The add power is calculated as a defocus corresponding to the residual aberrations.

13 Claims, No Drawings

METHOD AND APPARATUS FOR MEASURING ADD POWER OF A CONTACT LENS

FIELD

This disclosure relates to the field of contact lenses. In particular, the disclosure provides a method of and apparatus for measuring the add power of a contact lens. Example embodiments of the invention relate to multifocal toric contact lenses.

BACKGROUND

As people age, their eyes lose their ability to accommodate, that is to change the distance at which their eyes focus and, in particular, to focus on near objects. The eye accommodates by changing the shape of its lens, to produce a stronger or weaker lens to image nearer or farther objects, respectively. As the eye ages, the maximum focusing power that its lens can provide reduces. This loss of accommodation is known as presbyopia, and typically becomes noticeable in people's 30s, 40s or 50s. Presbyopia is traditionally compensated for by prescribing spectacles with magnifying lenses, that is lenses having a positive power, which supplement the focusing power of the eye to enable focusing on near objects.

Other common eye defects are myopia (short sight, wherein an object in the far distance is focused in front of the retina) and astigmatism (wherein the eye focuses light differently in two orthogonal planes). Myopia is compensated for by using a lens having negative optical power, i.e. a concave, defocusing lens. Astigmatism is compensated for by using a lens having different optical powers in the two orthogonal planes, equivalent to a spherical lens plus a cylindrical lens.

Where an eye has myopia and/or astigmatism, as well as presbyopia, the presbyopia is typically treated by providing a lens having different transverse regions with different powers. For example, a traditional bifocal spectacle lens, for a person with both myopia and presbyopia, has a mid/upper region for distance vision, and a lower region for near vision. The distance vision region has negative optical power. The optical power of the near vision region is positive, relative to the distance vision region. So, for example, a myope requiring a −3 diopter (D) lens portion for distance vision may require only a −2D lens portion for near work; the near vision region of the lens then has an optical power of +1 D, relative to the distance vision region. The lens is then said to have an "add power" of +1 D.

Like a myope, an emmetrope (a person with normal vision) will also lose the ability to accommodate as they get older. For near work, they will need a corrective lens having just the add power, which will actually be the power of the lens (e.g. the base power of the lens is 0 D and the add power is +2D then it is a +2D lens).

A hyperope (a person with long-sight) will also lose the ability to accommodate as they get older. They will already need a positive power of lens to correct their hyperopia, and will need a further add power for near work. For example, a +3D hyperope may require +1 D add power, resulting in a power of +4 D in the near vision region.

Astigmatism further complicates the situation. A myope with vertical astigmatism may require, for example, a −2D lens to compensate for the myopia and an additional −2D in the 0 degrees-180 degrees plane (but not in the 90 degrees-270 degrees plane). As the astigmatic myope ages, there may be an add power requirement of, say, +1 D for near work, resulting in a lens with a near-vision region that is −3D in the 0 degrees-180 degrees plane and −1 D in the 90 degrees-270 degrees plane.

When wearing spectacles, a person can look through different regions of the lens by moving their eyes, looking through the mid/upper region for distance vision and looking down through the lower region for near vision. When wearing contact lenses, however, that is not possible, as the contact lens moves with the eye. One approach to compensating for presbyopia is the so-called monovision approach, in which a lens for distance vision is prescribed for one eye and a lens for near vision is prescribed for the other eye. However, a preferred approach is to provide one or more add-power regions on the contact lens. A common approach is to provide a contact lens with an optical zone (i.e. the zone through which light passes into the eye) having a central region proving near vision, surrounded by an annulus providing distance vision (N-type lens) or a central region providing distance vision, surrounded by an annulus providing near vision (D-type lens). A transition or blending region may be provided between the near region and the distance region. There may be one or more additional annulus, with each successive annulus being a near region or a distance region, alternately. Again, blending regions may be provided between each annulus.

Contact lenses having at least one near-vision region and at least one distance-vision region are referred to as multifocal contact lenses.

One of the front surface or back surface of the contact lens will be structured to provide the distance-vision correction, and the other surface will be structured to provide the near-vision correction. For example, the front of the contact lens may be a spherical surface having a radius of curvature appropriate for correction of the distance vision, and the back of the contact lens may have a central region having a radius of curvature that, in conjunction with the radius of curvature of the front region, provides the distance-vision correction, and an annular region having a radius of curvature that, in conjunction with the radius of curvature of the front surface, provides the near-vision correction. Alternatively, the necessary curvatures for both the distance-vision correction and the near-vision correction may be provided on the front surface of the contact lens.

Silicone hydrogel contact lenses have particularly desirable material properties, including high permeability to oxygen. The lenses are produced by cast moulding monomers to produce a dry lens, which is then hydrated. The hydration alters the dimensions of the lens, meaning that the power of the hydrated lens is different from that of the dry lens (and hence different from the apparent power of the mould used to make the lens). Furthermore, there is some variability in the hydration process, resulting in a variability in the power of the hydrated lens.

It is therefore desirable to measure the power of a hydrated contact lens, which can be either a hydrogel contact lens or a silicone hydrogel contact lens, to check that it has the correct power (within acceptable manufacturing tolerances).

It is straightforward to measure the power of a simple contact lens (i.e. a contact lens having only a single, spherical power), for example using a focimeter (or lensometer). It is also relatively straightforward to measure the power of each region of a multifocal contact lens. It can be done, for example, by tilting the lens or by using one or more masks to ensure that light can pass only through the region to be measured. For example, for a D-type lens with a central distance-vision region and one annular near-vision region, the distance power can be measured using a focimeter and a mask that allows light to pass only through the central region of the lens, and the near power can be measured using a focimeter and a mask that allows light to pass only through the near-vision annulus. However, power measurements using a focimeter can be affected by lens tilt, incorrect lens centering on the focimeter stage or the stop, poor transmission of light and the lens design profile. Additionally, as just described, when using a focimeter to measure the 'add power', two measurements of power are required, a measurement using a central aperture and a measurement in the annular region of the lens outside the central zone. However, in some contact lenses the power profile is changing with radial distance and is non-symmetric. That can result in the best measurement of power actually being the best focus point rather than the average power of the annular zone. Additionally, tilting the lens or changing stops requires the position of the lens to be changed between measurements, resulting in inconsistent lens placement.

A particular problem arises with multifocal contact lenses that are structured also to compensate for astigmatism. Such lenses are referred to as multifocal toric lenses, as their surfaces have different curvatures in two orthogonal directions, like the surface of a torus. It is relatively difficult to provide masks that reliably mask the correct portions of the lens for a focimeter measurement. Without masks, the complex structure of the lens—with multiple zones and lack of circular symmetry—typically results in there being no clear focal point that the focimeter can measure.

The present disclosure addresses these and other needs.

SUMMARY

Briefly and in general terms, the present disclosure addresses apparatus and methods directed towards improving measurement of the add power of a contact lens. The present disclosure further addresses approaches to measurement of the add power of a multifocal toric contact lens.

A first aspect of the disclosure provides a method of measuring the add power of a contact lens. The contact lens has a central region and an annular region surrounding the central region. The central region has a first optical power and the annular region has a second optical power. The wavefront aberration of the contact lens is measured. A polynomial is fitted to the measured wavefront aberration. Terms of the polynomial correspond to types of aberration comprising defocus and astigmatism and residual aberrations. The add power is calculated as a defocus corresponding to the residual aberrations.

A second aspect of the disclosure provides a method of manufacturing a contact lens, in which a contact lens is formed to have a shape selected to provide a selected add power. The add power of the cast contact lens is measured using the method of the first aspect of the disclosure. The contact lens is rejected if the measured add power differs from the selected add power by more than a selected acceptable error margin.

A third aspect of the disclosure provides an apparatus for measuring the add power of a contact lens. The contact lens has a central region and an annular region surrounding the central region. The central region has a first optical power and the annular region has a second optical power. The apparatus comprises a wavefront sensor, for measuring the wavefront aberration of the contact lens, and a processor. The processor is adapted to fit a polynomial to the measured wavefront aberration. Terms of the polynomial correspond to types of aberration comprising defocus and astigmatism and residual aberrations. The processor is also adapted to calculate the add power as a defocus corresponding to the residual aberrations.

A fourth aspect of the invention provides a software product adapted to, when run, fit a polynomial to a wavefront aberration of a contact lens. Terms of the polynomial correspond to types of aberration comprising defocus and astigmatism and residual aberrations. The software product calculates the add power of a contact lens as a defocus corresponding to the residual aberrations.

It will be appreciated that features described in relation to one aspect of the present disclosure can be incorporated into other aspects of the present disclosure. For example, an apparatus of the disclosure can incorporate any of the features described with reference to a method of the disclosure, and vice versa. Moreover, additional embodiments and aspects of the disclosure will be apparent from the following description, and claims. As can be appreciated from the foregoing and following description, each and every feature described herein, and each and every combination of two or more of such features, and each and every combination of one or more values defining a range, are included within the scope of the present disclosure provided that the features included in such a combination are not mutually inconsistent. In addition, any feature or combination of features or any value(s) defining a range may be specifically excluded from any embodiment of the present disclosure.

DETAILED DESCRIPTION

Embodiments of the present disclosure are described herein in the context of approaches to improve measurement of the add power of a contact lens. Briefly, the add power of a contact lens is measured by calculating the add power as a defocus corresponding to the residual, higher-order, aberrations remaining after defocus and astigmatism are removed.

Those of ordinary skill in the art will realize that the following detailed description of the present disclosure is illustrative only and is not intended to be in any way limiting. Other embodiments of the present disclosure will readily suggest themselves to such skilled persons having the benefit of this disclosure.

As previously stated, in a first aspect, the present disclosure is directed to a method of measuring the add power of a contact lens having a central region and an annular region surrounding the central region, the central region having a first optical power and the annular region having a second optical power, the method including the steps:

(a) measuring the wavefront aberration of the contact lens;

(b) fitting a polynomial to the measured wavefront aberration, wherein terms of the polynomial correspond to types of aberration comprising defocus and astigmatism and residual aberrations; and (c) calculating the add power as a defocus corresponding to the residual aberrations.

The residual aberrations will be the aberrations of higher-order than defocus and astigmatism. (The lower-order aberrations of piston and tilt are generally disregarded when considering the wavefront aberration of a contact lens.) For multifocal contact lenses, including multifocal toric contact lenses, it is expected that the residual aberrations will be dominated by spherical aberration.

The contact lens may have, for example, an add power in the range +0.25 D to +5 D, preferably +0.5 D to +3D. The add power may be an integer, half integer or quarter integer number of diopters. The calculated add power may be rounded to an integer, half integer or quarter integer number of diopters.

The contact lens may be a toric contact lens.

The central region may be a distance-vision region (i.e. the first optical power may be a negative number of diopters) and the annular region a near-vision region (i.e. the second optical power may be a positive number of diopters or a less negative number of diopters relative to the first optical power). Alternatively, the central region may be a near-vision region and the annular region a distance-vision region.

The contact lens may include at least one further annular region surrounding the annular region and having the same power as the central region.

The contact lens may include at least a second further annular region surrounding the further annular region and having the same power as the annular region.

There may be a transition region between the central region and the annular region and/or between adjacent annular regions, if any.

The annular region or at least one annular region or all of the annular regions may have a single optical or refractive power. Alternatively, the annular region or at least one annular region or all of the annular regions may have a power that varies with radius (i.e. it may be an aspheric region) In that case, the second optical power will be an average power of the annular region. Similarly, the central region may be an aspheric region and the first optical power will then be an average power of the central region.

The method may include the step of defining a region of the lens, for example a circle or annulus, and calculating the add power as a defocus corresponding to the residual aberrations within the defined region. The defined region may, for example, be the central region, or a portion of the central region, or an annular region having the first optical power, or a portion of that annular region, when the first optical power includes the add power. The defined region may, for example, be an annular region having the second optical power, or a portion of that region, when the second optical power includes the add power.

The wavefront aberration of the contact lens may be measured using a wavefront sensor, for example a Shack-Hartmann wavefront sensor.

The polynomial may be a series expansion, for example a Siedel expansion.

The polynomial may be a weighted sum of orthogonal polynomials. The orthogonal polynomials may be Zernike circle polynomials. In such an embodiment, the term corresponding to defocus is $Z_2^0$ and the terms corresponding to astigmatism are $Z_2^{-2}$ and $Z_2^{+2}$. The terms corresponding to residual aberrations may be Zernike circle polynomials of $3^{rd}$ and higher radial order.

The polynomial may for example be fitted by the method of least squares.

The add power may be calculated as the spherical equivalent of the residual aberrations. The add power may be calculated as the spherical equivalent of the spherical aberration.

Calculating the add power may include the steps of discarding from the polynomial the terms of the polynomial that correspond to defocus and astigmatism to obtain a modified polynomial and calculating the residual aberrations using the modified polynomial. The method may also include the step of disregarding from the polynomial the terms of the polynomial that correspond to piston and tilt; the residual aberrations will then be calculated using the modified polynomial without piston, tilt, defocus and astigmatism. (Piston and tilt are generally ignored anyway in ophthalmology.) The terms may be discarded by setting to zero in the polynomial a co-efficient of each term to be discarded.

Preferably, the modified polynomial contains only terms of higher aberration order than defocus and astigmatism.

The add power of the lens may be calculated by calculating a power profile from the modified polynomial. The power profile may be calculated from wavefront curvatures obtained from the modified polynomial.

The method may further include the step of labelling a container for the contact lens with the calculated add power.

As previously stated, in a second aspect, the present disclosure is directed to a method of manufacturing a contact lens, the method comprising the steps of:
 (1) forming the contact lens to have a shape selected to provide a selected add power;
 (2) measuring the add power of the cast contact lens using the method described above; and
 (3) rejecting the contact lens if the measured add power differs from the selected add power by more than a selected acceptable error margin.

The acceptable error margin may be +/−0.25 D, for example.

The contact lens may be formed by cast moulding the contact lens using a mould having a shape selected to form the contact lens to have selected add power. The contact lens may be formed by cast-moulding a lens blank and latching the lens blank to have a shape selected to provide the selected add power.

As previously stated, in a third aspect, the present disclosure is directed to apparatus for measuring the add power of a contact lens having a central region and an annular region surrounding the central region, the central region having a first optical power and the annular region having a second optical power, the apparatus comprising:
 (a) a wavefront sensor for measuring the wavefront aberration of the contact lens;
 (b) a processor adapted to:
  (i) fit a polynomial to the measured wavefront aberration, wherein terms of the polynomial correspond to types of aberration comprising defocus and astigmatism and residual aberrations; and
  (ii) calculate the add power as a defocus corresponding to the residual aberrations.

The wavefront sensor may be a Shack-Hartmann wavefront sensor.

The apparatus may further comprise a display for displaying the calculated add power.

As previously stated, in a fourth aspect, the present disclosure is directed to a software product adapted to, when run,
 (a) fit a polynomial to a wavefront aberration of a contact lens, wherein terms of the polynomial correspond to types of aberration comprising defocus and astigmatism and residual aberrations; and
 (b) calculate the add power of a contact lens as a defocus corresponding to the residual aberrations.

In a perfect imaging system, an infinitesimally small point source would be imaged as an infinitesimally small point image. In a real-world imaging system, points are imaged as images of finite size. For light propagating through a lens, the dominant causes of that spreading of the image point are usually wavefront aberrations caused by the lens. Light is slowed when it passes from a medium with a lower refractive index into a medium with a higher refractive index, and it speeds up when it passes from a medium with a higher refractive index into a medium with a lower refractive index. When light passes through a lens having one or two curved surfaces, different transverse points on the wavefront of the light pass the curved surfaces at different times, and hence spend different amounts of time in the lens material. Consequently, the shape of the wavefront is changed by the propagation through the lens. For perfect focusing to a single, infinitesimal, focal point, the wavefront leaving the lens would coincide with a sphere (called the Gaussian reference sphere), centered on the focal point and having a radius equal to the distance from the focal point to the lens. The distance along a light ray between the point of intersection of the ray with the Gaussian reference sphere and the point of intersection of the ray with the actual wavefront is the wave aberration of that light ray. More generally, the wavefront aberration is a function giving the distance between the ideal wavefront and the actual wavefront, for all points in the object and image planes.

The wavefront aberration of a given lens (or system of lenses or other optical components) is a physical fact, but it can be described in different ways mathematically. The wavefront aberration can be written as a power series expansion. Conventionally, the five third-order polynomial terms are identified as spherical aberration, coma, astigmatism, curvature of field, and distortion, and they are known as the primary or Seidel aberrations. There are also named fourth-order aberrations. Seidel aberrations are well-known for conventional optical systems, in particular rotationally symmetric optical systems.

In ophthalmology, it is usually more convenient to describe aberrations by a different expansion, the Zernike polynomial series.

Zernike polynomials are orthogonal over a circular pupil. They include several lower-order power series terms which act to "balance" aberrations of different orders against each other so as to maximize the normalized intensity at the Gaussian focus. Zernike polynomials are convenient to use in describing aberrations: for example:

the contribution of each Zernike aberration mode is given by the magnitude of its coefficient in the series;
addition of more Zernike aberration modes increases the total wavefront error;
higher-order Zernike modes do not affect lower-order Zernike modes; and
eliminating wavefront aberrations up to a given Zernike radial order minimizes total wavefront error up to that order.

The Seidel aberrations have terms depending on the viewing angle, whereas the Zernike modes are calculated along a single viewing angle, so multiple calculations must be done to analyse multiple viewing angles.

Zernike polynomials Z can be written in the form $R_n^m(\rho) g(\theta)$, where $g(\theta)$ repeats itself every 360 degrees of azimuthal angle $\theta$. $R_n^m(\rho)$ is a polynomial function of radius $\rho$ of degree n which contains no power of $\rho$ less than m. $R_n^m(\rho)$ is even if m is even and odd if m is odd. It is convenient to treat the even and odd Zernike polynomials separately, as:

$$Z_n^m(\rho,\theta) = R_n^m(\rho)\cos(m\theta) \text{ for } m \text{ even, and}$$

$$Z_n^{-m}(\rho,\theta) = R_n^m(\rho)\sin(m\theta) \text{ for } m \text{ odd.}$$

where m is usually called the azimuthal frequency.

The radial polynomial has the form:

$$R_n^{\pm m}(\rho) = \sum_{s=0}^{\frac{n-m}{2}} (-1)^s \frac{(n-s)!}{s!\left(\frac{n+m}{2}-s\right)!\left(\frac{n-m}{2}-s\right)!} \rho^{n-2s}$$

for (n−m) even and 0 for (n−m) odd.

The aberration function can then be written:

$$\Phi(\rho,\theta) = \sum_{n=0}^{\infty} \sum_{m=0}^{n} \left[\frac{2(n+1)}{1+\delta_{m0}}\right]^{\frac{1}{2}} R_n^m(\rho)(c_{nm}\cos(m\theta) + s_{nm}\sin(m\theta))$$

where $c_{nm}$ and $s_{nm}$ are the expansion coefficients, $\delta_{ij}$ is a Kronecker delta.

Other forms of the Zernike expansion are used in the art, and any suitable form may be used in fitting the polynomial to the measured wavefront.

The aberrations corresponding to the Zernike polynomials of the first four radial degrees are:

| n | m | Polynomial form | Name of aberration |
|---|---|---|---|
| 0 | 0 | 1 | Piston |
| 1 | −1 | 2 ρ sin θ | Tilt |
| 1 | 1 | 2 ρ cos θ | Tip |
| 2 | −2 | $\sqrt{6}$ ρ² sin 2θ | Oblique astigmatism |
| 2 | 0 | $\sqrt{3}$ (2ρ² − 1) | Defocus |
| 2 | 2 | $\sqrt{6}$ ρ² cos 2θ | Vertical astigmatism |
| 3 | −3 | $\sqrt{8}$ ρ³ sin 3θ | Vertical trefoil |
| 3 | −1 | $\sqrt{8}$ (3ρ³ − 2ρ) sin θ | Vertical coma |
| 3 | 1 | $\sqrt{8}$ (3ρ³ − 2ρ) cos θ | Horizontal coma |
| 3 | 3 | $\sqrt{8}$ ρ³ cos 3θ | Oblique trefoil |
| 4 | −4 | $\sqrt{10}$ ρ⁴ sin 4θ | Oblique quadrafoil |
| 4 | −2 | $\sqrt{10}$ (4ρ⁴ − 3ρ²) sin 2θ | Oblique secondary astigmatism |
| 4 | 0 | $\sqrt{5}$ (6ρ⁴ − 6ρ² + 1) | Primary spherical |
| 4 | 2 | $\sqrt{10}$ (4ρ⁴ − 3ρ²) cos 2θ | Vertical secondary astigmatism |
| 4 | 4 | $\sqrt{10}$ ρ⁴ cos 4θ | Vertical quadrafoil |

Piston, tip and tilt are generally disregarded in ophthalmology. The second-order terms—vertical and oblique astigmatism and defocus—are of principal concern. As discussed above, for a multifocal contact lens, the higher-order terms have been found to be dominated by primary spherical aberration.

In an example method, a multifocal toric contact lens is placed in saline solution on a wavefront sensor. In this example, the wavefront sensor is a Shack-Hartmann wavefront sensor. Shack-Hartmann wavefront sensors are well-known devices for measuring wavefronts. To measure the effect of a contact lens on the wavefront, a collimated beam of light with a planar wavefront is passed through the contact lens. The structure of the contact lens introduces phase delays to the beam, distorting the wavefront. The distorted wavefront passes through a regular array of lenslets, each of which produces an image spot. For an undistorted, planar wavefront, the regular array of lenslets produces a regular array of spots. Distortions in the wavefront are local curvatures of the wavefront, which manifest themselves as local tilts in the wavefront as it hits the lenslets. That results in the spots being displaced from their position in the regular array. The Shack-Hartmann wavefront sensor recreates the shape of the wavefront from measurements of the displacements of the array of image spots. As the lenslets are discrete, the recreated wavefront is also in the form of an array of discrete data points. A two-dimensional polynomial (i.e. a polynomial surface) can be fitted to the array of wavefront data points.

The lens is illuminated with a uniform beam of collimated LED light, and the wavefront of the light after it has passed through the lens is measured using the wavefront sensor, in the usual manner.

The wavefront sensor in this example measures the first 37 terms of the Zernike polynomial, by fitting them to the measured wavefront using a least-squares fit. In the software used in this example, the terms corresponding to defocus and astigmatism are set to zero, forming a modified Zernike polynomial, corresponding to a modified wavefront. The operator specifies the spatial extent of the add zone, for example the inner and outer radii, and the lens power profile corresponding to the modified wavefront is calculated for that zone. The modified Zernike polynomial, and hence aberrations in the modified wavefront, remaining after the defocus and astigmatism terms are set to zero, is dominated by spherical aberration, and in particular, it is dominated by the spherical aberration resulting from the structure of the contact lens. The calculated power profile is therefore similarly dominated by the structure giving rise to the spherical aberration, i.e. the near-vision, "add" zone. The add power of the lens can therefore be determined directly from the calculated power profile.

Strictly, only the second-order Zernike aberration mode coefficients, corresponding to defocus and astigmatism, are directly related to optical focusing power in units of Diopters. However, by assuming that if two Zernike aberration modes have equal root mean square (RMS) wavefront errors they degrade vision by the same amount, one can define a "spherical equivalent" (SE) in diopters for any aberration mode. Specifically:

$$SE = \frac{-4\sqrt{3}}{\rho^2} C_n^m$$

where $C_n^m$ is the aberration coefficient in microns of the Zernike mode and $\rho$ is the radius in mm of the pupil at which the coefficient was determined. So, when the defocus and astigmatism polynomials are disregarded, each of the remaining terms provides a further "defocus" approximately equal to the SE. For a multifocal lens, the structure providing the add power results in the remaining terms being dominated by spherical aberration, and therefore the measured "defocus" is approximately equal to the add power of the lens.

Although a focimeter typically does not give reliable results when measuring the add power of a multifocal toric lens, the efficacy of example embodiments of the present method may be assessed by making measurements on multifocal, non-toric (i.e. circularly symmetric) contact lenses. Thus, measurements, obtained by the example method, may be compared with measurements obtained using a focimeter. The tolerances recommended by ISO 18639-2 may be used to assign upper and lower specification limits.

The Optocraft is a wavefront sensor that can measure optical parameters of a contact lens in saline solution. Optocraft software SHSWorks can analyse the wavefront of a lens by fitting Zernike polynomials. A modified version of the software enables the coefficients of the Zernike polynomials to be adjusted.

The Bon focimeter uses a combination of a 2 or 3 mm aperture stage and a 4-5 mm annular stage to manually measure the sphere power, cylinder power, add power and axis of multifocal lenses in air.

As described above, in the example method, the measured wavefront is adjusted by discarding Zernike polynomial terms to eliminate the portions of the wavefront that are specifically attributed to the defocus and astigmatism, leaving a wavefront that is dominated by the add power.

The add results measured on the wavefront sensor and focimeter may be compared to determine whether the means of the add powers of the two systems were equivalent, for example using Minitab® software from Minitab Inc. The results may be separated by target sphere, target add power and lens design to test the equivalence of the means across the range of lots.

The add power may be calculated as the absolute difference between the annular zone of the lens and the sphere power of the lens (the sphere power of the lens may be, for example, the central 2 mm for N type lenses and the central 3 mm for D type lenses).

A paired equivalence test may be used to provide evidence that the mean of the majority add powers measured on the wavefront sensor and focimeter are equivalent. For example an upper and lower tolerance specification of +0.50 D for core powers and ±1.00 D for extended range powers may be used.

A paired t-test may be used to assess whether the means of the add power measured by the Bon focimeter and the Optocraft wave sensor are significantly different, within the upper and lower specification limits. The difference between the mean add power measured using the wavefront sensor and the mean add power measured using the focimeter may be less than 0.3 D, preferably less than 0.2 D, more preferably less than 0.1 D and still more preferably less than 0.5 D. The paired t-test may be used to assess whether the means differ at the 0.05 level of significance. There may be a 95% confidence level that the true mean difference is less than 0.20 D, preferably less than 0.15 D, more preferably less than 0.12 D.

Thus, that approach is a way to verify that the example method of using an adjusted wavefront calculation is capable of extracting the add power of a multifocal lens, as it shows the equivalence between the wavefront sensor and the focimeter for the measurement of add power using the measurement tolerances of the focimeter and ISO 18639-2 for the upper and lower specification limits.

A further study, a Gauge R&R (GRR) study, may be carried out to provide further supporting evidence that the example method is capable of measuring the add power of D and N type Multifocal toric (MFT) contact lenses.

The GRR study may be conducted using the wavefront sensor used in the first study (described above) to test the approach of measuring the add power of MFT N and D type lenses.

Two 10×3×3 crossed GRRs may be performed: one GRR for D type and one GRR for N type lenses, wherein 10 lens samples are measured 3 times by 3 operators, using multifocal toric contact lenses designed with a toric and multifocal part within the optical power profile.

The sphere, cylinder, add and axis of each lens may be measured. Minitab® software may be used to generate an ANOVA crossed GRR study for each measurement parameter.

The "Total Gauge R&R" standard deviation may be used to calculate how many measurements of the same lens parameter would be required to be ISO compliant, based on a 95% confidence level and the product tolerances recommended by ISO 18369-2:2012.

For a single measurement, the measurement tolerance can be calculated (with a 95% confidence) as follows:

$$MT = 1.96 S_{R+R} \quad (1)$$

where $S_{R+R}$ is the total Gauge R&R standard deviation.

For multiple measurements (with 95% confidence), the measurement tolerance can be calculated:

$$MT = \frac{1.96 S_{R+R}}{\sqrt{X}} \quad (2)$$

where X is the number of measurements.

According to ISO 18369-3: 2006, the product tolerance should be at least twice that of the measurement tolerance.

$$\frac{PT}{MT} = 2 \quad (3)$$

where PT is the product tolerance and MT is the measurement tolerance.

Using equations (2) and (3) the number of measurements X required to measure a parameter with 95% confidence can be estimated. The total GRR standard deviation may be less than 0.06, preferably less than 0.03. Measurement on a single lens may be sufficient to ensure 95% confidence in the measurement.

The study may thus provide supporting evidence that the method is capable of measuring optical parameters of MFT contact lenses, including the add power.

While the present disclosure has been described and illustrated with reference to particular embodiments, it will be appreciated by those of ordinary skill in the art that the disclosure lends itself to many different variations not specifically illustrated herein.

Where, in the foregoing description, integers or elements are mentioned that have known, obvious, or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional do not limit the scope of the independent claims. Moreover, it is to be understood that such optional integers or features, while of possible benefit in some embodiments of the disclosure, may not be desirable, and can therefore be absent, in other embodiments.

The invention claimed is:

1. A method of measuring the add power of a contact lens having a central region and an annular region surrounding the central region, the central region having a first optical power and the annular region having a second optical power, the method including the steps:
   (a) measuring the wavefront aberration of the contact lens;
   (b) fitting a polynomial to the measured wavefront aberration, wherein terms of the polynomial correspond to types of aberration comprising defocus and astigmatism and residual aberrations; and
   (c) calculating the add power as a defocus corresponding to the residual aberrations,
   wherein calculating the add power includes the steps of discarding from the polynomial the terms of the polynomial that correspond to defocus and astigmatism to obtain a modified polynomial that contains only terms of higher aberration order than defocus and astigmatism and calculating the residual aberrations using the modified polynomial; and
   the add power is calculated as the spherical equivalent of the residual aberrations or the spherical aberration.

2. A method as claimed in claim 1, wherein the contact lens is a toric contact lens.

3. A method as claimed in claim 1, wherein the central region is a distance-vision region and the annular region a near-vision region.

4. A method as claimed in claim 1, wherein the central region is a near-vision region and the annular region a distance-vision region.

5. A method as claimed in claim 1, wherein the contact lens includes at least one further annular region surrounding the annular region and having the same power as the central region.

6. A method as claimed in claim 5, wherein the contact lens includes at least a second further annular region surrounding the further annular region and having the same power as the annular region.

7. A method as claimed in claim 1, wherein the polynomial is a series expansion.

8. A method as claimed in claim 1, wherein the polynomial is a weighted sum of orthogonal polynomials.

9. A method as claimed in claim 8, wherein the orthogonal polynomials are Zernike circle polynomials.

10. A method as claimed in claim 1, wherein the add power is calculated as the spherical equivalent of the spherical aberration.

11. A method of manufacturing a contact lens, the method comprising the steps of:
   (1) forming the contact lens to have a shape selected to provide a selected add power;
   (2) measuring the add power of the contact lens using a method including the steps: (a) measuring the wavefront aberration of the contact lens; (b) fitting a polynomial to the measured wavefront aberration, wherein terms of the polynomial correspond to types of aberration comprising defocus and astigmatism and residual aberrations; and (c) calculating the add power as a defocus corresponding to the residual aberrations wherein calculating the add power includes the steps of discarding from the polynomial the terms of the polynomial that correspond to defocus and astigmatism to obtain a modified polynomial that contains only terms of higher aberration order than defocus and astigmatism and calculating the residual aberrations using the modified polynomial; and the add power is calculated as the spherical equivalent of the residual aberrations or the spherical aberration; and
   (3) rejecting the contact lens if the measured add power differs from the selected add power by more than a selected acceptable error margin.

12. Apparatus for measuring the add power of a contact lens having a central region and an annular region surrounding the central region, the central region having a first optical power and the annular region having a second optical power, the apparatus comprising:
   (a) a wavefront sensor for measuring the wavefront aberration of the contact lens;
   (b) a processor adapted to:
      (i) fit a polynomial to the measured wavefront aberration, wherein terms of the polynomial correspond to types of aberration comprising defocus and astigmatism and residual aberrations; and (ii) calculate the add power as a defocus corresponding to the residual aberrations, wherein calculating the add power includes the steps of discarding from the polynomial the terms of the polynomial that correspond to defocus and astigmatism to obtain a modified polynomial and calculating the residual aberrations using the modified polynomial; and the modified polynomial contains only terms of higher aberration order than defocus and astigmatism; and the add power is calculated as the spherical equivalent of the residual aberrations or the spherical aberration.

13. A software product adapted to, when run, (a) fit a polynomial to a wavefront aberration of a contact lens, wherein terms of the polynomial correspond to types of aberration comprising defocus and astigmatism and residual aberrations; and (b) calculate the add power of the contact lens as a defocus corresponding to the residual aberrations, wherein calculating the add power includes the steps of discarding from the polynomial the terms of the polynomial that correspond to defocus and astigmatism to obtain a modified polynomial and calculating the residual aberrations using the modified polynomial; and the modified polynomial contains only terms of higher aberration order than defocus and astigmatism; and the add power is calculated as the spherical equivalent of the residual aberrations or the spherical aberration.

* * * * *